US011364639B2

(12) United States Patent
Seo et al.

(10) Patent No.: US 11,364,639 B2
(45) Date of Patent: Jun. 21, 2022

(54) CONSTRUCTION ROBOT FOR CEILING

(71) Applicants: DAEMYOUNGGEC CO., LTD., Seoul (KR); SAMSUNG C&T CORPORATION, Seoul (KR)

(72) Inventors: Jong Man Seo, Seoul (KR); Sung Hu Lee, Seoul (KR); Jung Hwan Ji, Seoul (KR); Young Woon Jun, Gyeonggi-do (KR); Chun Won Park, Gyeonggi-do (KR); Kye Young Lee, Seoul (KR); Chul Young Kim, Seoul (KR)

(73) Assignees: DAEMYOUNGGEC CO., LTD., Seoul (KR); SAMSUNG C&T CORPORATION, Seoul (KR)

( * ) Notice: Subject to any disclaimer, the term of this patent is extended or adjusted under 35 U.S.C. 154(b) by 102 days.

(21) Appl. No.: 16/953,685

(22) Filed: Nov. 20, 2020

(65) Prior Publication Data

US 2021/0205998 A1    Jul. 8, 2021

(30) Foreign Application Priority Data

Jan. 7, 2020    (KR) .......................... 10-2020-0002294

(51) Int. Cl.
| | |
|---|---|
| *B25J 11/00* | (2006.01) |
| *B25J 9/00* | (2006.01) |
| *B25J 9/02* | (2006.01) |
| *B25J 9/04* | (2006.01) |
| *B25J 9/10* | (2006.01) |
| *B25J 15/00* | (2006.01) |

(52) U.S. Cl.
CPC .......... *B25J 11/005* (2013.01); *B25J 9/0087* (2013.01); *B25J 9/023* (2013.01); *B25J 9/041* (2013.01); *B25J 9/1035* (2013.01); *B25J 15/0004* (2013.01)

(58) Field of Classification Search
CPC . B25J 9/0087; B25J 9/023; B25J 9/041; B25J 9/1035; B25J 11/005; B25J 15/0004
See application file for complete search history.

(56) References Cited

U.S. PATENT DOCUMENTS

2018/0326507 A1* 11/2018 Halvorsen ............... B23B 39/08
2021/0379767 A1* 12/2021 Kang ..................... B25J 9/1679

FOREIGN PATENT DOCUMENTS

| AU | 2020102623 A4 * 11/2020 |
| CN | 204343979 U  *  5/2015 |

* cited by examiner

*Primary Examiner* — Dale Moyer
(74) *Attorney, Agent, or Firm* — Miles & Stockbridge P.C.; Ajay Jagtiani

(57) ABSTRACT

A construction robot for a ceiling is provided. The construction robot includes: a robot base having an upper plate; a targeting unit on the upper plate, wherein the targeting unit moves a robotic arm assembly combined with the targeting unit, and wherein the robotic arm assembly includes: a first robotic arm where a drill is mounted, wherein a first elevating unit of the first robotic arm is elevated or lowered according to information on the ceiling, a second robotic arm where an anchor bolt inserting equipment is mounted, wherein a second elevating unit of the second robotic arm is elevated or lowered according to the information, and a third robotic arm where an impact wrench is mounted, wherein a third elevating unit of the third robotic arm is elevated or lowered likewise; and a loading unit on the upper plate or the targeting unit for providing anchor bolt assemblies.

9 Claims, 8 Drawing Sheets

CONSTRUCTION ROBOT FOR CEILING

FIELD OF THE DISCLOSURE

The present disclosure relates to a construction robot for a ceiling; and more particularly, to the construction robot for inserting anchors into the ceiling.

BACKGROUND OF THE DISCLOSURE

In general, anchors are installed for supporting wiring or ducts in a ceiling of a workplace in various industrial sites.

In the process of such anchor installation, first, a hole for the anchor installation is drilled on a spot in the ceiling, then an anchor bolt is inserted into the drilled hole, and an anchor nut is fastened to the inserted anchor bolt. For example, Korean Patent Laid-Open Publication No. 10-2017-0014700 or Korean Patent Registration No. 10-1381958 may be referred to for details.

Conventionally, however, in order to perform such a work, a drill is prepared to drill the hole into the ceiling, and then an anchor bolt inserting equipment is prepared to insert the anchor bolt into the drilled hole. These processes are repeated throughout the work as needed. As a result, time required for installing the anchor bolts is excessively increased.

In addition, although conventional devices are configured to be elevated and lowered to perform the work on the ceiling, an exact position of an entire device must be finely adjusted to perform the work on an exact spot, which is much difficult.

Also, the conventional anchor bolt inserting equipment has a problem in that the anchor bolt must be manually loaded into the anchor bolt inserting equipment whenever the anchor bolt needs to be inserted into the hole.

SUMMARY OF THE DISCLOSURE

It is an object of the present disclosure to solve all the aforementioned problems.

It is another object of the present disclosure to reduce time consumed for inserting anchor bolts into a ceiling by using a method and a structure for controlling a drill for drilling a hole, an anchor bolt inserting equipment for inserting at least one anchor bolt into the hole, and an impact wrench for tightening at least one anchor nut engaged with the inserted anchor bolt.

It is still another object of the present disclosure to allow the anchor installation even in a tight space by using the drill, the anchor bolt inserting equipment, and the impact wrench interchangeably due to rotation of a rotating sub-unit on which the drill, the anchor bolt inserting equipment, and the impact wrench are mounted.

It is still yet another object of the present disclosure to allow each of the drill, the anchor bolt inserting equipment, and the impact wrench to be positioned under a same location on the ceiling by the rotation of the rotating sub-unit alone.

It is still yet another object of the present disclosure to allow the anchor bolt and the anchor nut to be automatically provided by using a loading unit.

It is still yet another object of the present disclosure to allow an upper plate, on which the rotating sub-unit is mounted, to be leveled by using a plurality of leveling units.

In order to accomplish objects above and characteristic effects to be described later of the present disclosure, distinctive structures of the present disclosure are described as follows.

In accordance with one aspect of the present disclosure, there is provided a construction robot for a ceiling, including: a robot base including an upper plate, wherein the upper plate is controlled to be elevated or lowered for anchor installation; a targeting unit mounted on the upper plate, wherein the targeting unit is controlled to move a robotic arm assembly for the anchor installation, and wherein the robotic arm assembly includes: a first robotic arm, combined with the targeting unit, on which a drill for drilling a hole into the ceiling is mounted, wherein at least part of a first elevating unit of the first robotic arm is controlled to be elevated or lowered according to the information on the ceiling, a second robotic arm, combined with the targeting unit, on which an anchor bolt inserting equipment for inserting at least one anchor bolt into the hole is mounted, wherein at least part of a second elevating unit of the second robotic arm is controlled to be elevated or lowered according to the information on the ceiling, and a third robotic arm, combined with the targeting unit, on which an impact wrench for tightening the anchor bolt by engaging at least one anchor nut with the anchor bolt is mounted, wherein at least part of a third elevating unit of the third robotic arm is controlled to be elevated or lowered according to the information on the ceiling; and a loading unit, mounted on at least one of the upper plate and the targeting unit, for providing one or more anchor bolt assemblies, each of which is created by engaging the anchor bolt with the anchor nut.

As one example, each of the first robotic arm, the second robotic arm, and the third robotic arm, respectively combined with a rotating sub-unit in the targeting unit, is controlled to move along a same trajectory when the rotating sub-unit is controlled to rotate about its own axis.

As one example, each of the first robotic arm, the second robotic arm, and the third robotic arm includes (1) its corresponding each of arm supporting units combined with a rotating sub-unit in the targeting unit and (2) its corresponding each of elevating units engaged with each of the arm supporting units and wherein at least part of each of the elevating units, driven by each of servomotors for vertical movement combined with each of the arm supporting units, is controlled to be elevated or lowered.

As one example, the targeting unit includes: a first targeting sub-unit mounted on the upper plate wherein the first targeting sub-unit is controlled to move along first directions corresponding to at least one first rack, serving as a first track, on the upper plate according to information on the ceiling; a second targeting sub-unit mounted on the first targeting sub-unit wherein the second targeting sub-unit is controlled to move along second directions corresponding to at least one second rack, serving as a second track, on the first targeting sub-unit according to the information on the ceiling; and a rotating sub-unit mounted on the second targeting sub-unit wherein the rotating sub-unit is controlled to rotate about its own axis according to the information on the ceiling.

As one example, while a first pinion formed under the first targeting sub-unit is engaged with the first rack, the first targeting sub-unit is controlled to move along the first directions according to rotation of the first pinion driven by a first servomotor for horizontal movement, wherein, while a second pinion formed under the second targeting sub-unit is engaged with the second rack, the second targeting sub-unit is controlled to move along the second directions according to rotation of the second pinion driven by a second servomotor for the horizontal movement, and wherein the rotating sub-unit is controlled to rotate about its own axis by a third servomotor for the horizontal movement.

As one example, the loading unit includes (1) at least one load supporting unit mounted on at least one of the upper plate and the targeting unit and (2) an anchor assembly supplying unit, on which the anchor bolt assemblies are to be loaded, combined with the load supporting unit movably toward or away from the robotic arm assembly.

As one example, the construction robot further comprises a plurality of leveling units mounted on the upper plate movably toward or away from the ceiling and wherein the leveling units allow the upper plate to be leveled by making contact with the ceiling.

As one example, the upper plate is mounted on the robot base wherein the robot base includes a scissor lift which is controlled to elevate or lower the upper plate.

As one example, (i) the targeting unit is controlled to move toward the loading unit and then the rotating sub-unit is controlled to rotate about its own axis so that the third robotic arm is positioned near the loading unit, to thereby allow the impact wrench to loosen and disengage the anchor nut from one of the anchor bolt assemblies loaded on the loading unit and thus to hold the disengaged anchor nut, (ii) the rotating sub-unit is controlled to rotate about its own axis while the disengaged anchor nut is held by the impact wrench so that the second robotic arm is positioned near the loading unit, to thereby allow the anchor bolt inserting equipment to be provided with the anchor bolt, (iii) while the at least part of the first elevating unit of the first robotic arm is controlled to be elevated or lowered, the targeting unit is controlled to move to a specific spot in the ceiling and then the rotating sub-unit is controlled to rotate about its own axis so that the first robotic arm is positioned under the specific spot in the ceiling, to thereby allow the drill to drill the hole on the specific spot, (iv) while the at least part of the second elevating unit of the second robotic arm is controlled to be elevated or lowered, the rotating sub-unit is controlled to rotate about its own axis so that the second robotic arm is positioned under the specific spot, to thereby allow the anchor bolt inserting equipment to insert the anchor bolt into the hole, and (v) while the at least part of the third elevating unit of the third robotic arm is controlled to be elevated or lowered, the rotating sub-unit is controlled to rotate about its own axis so that the third robotic arm is positioned under the specific spot, to thereby allow the impact wrench to engage the anchor nut with the anchor bolt inserted into the hole and to tighten the anchor nut.

DETAILED DESCRIPTION OF THE PREFERRED EMBODIMENTS

Figure 1:
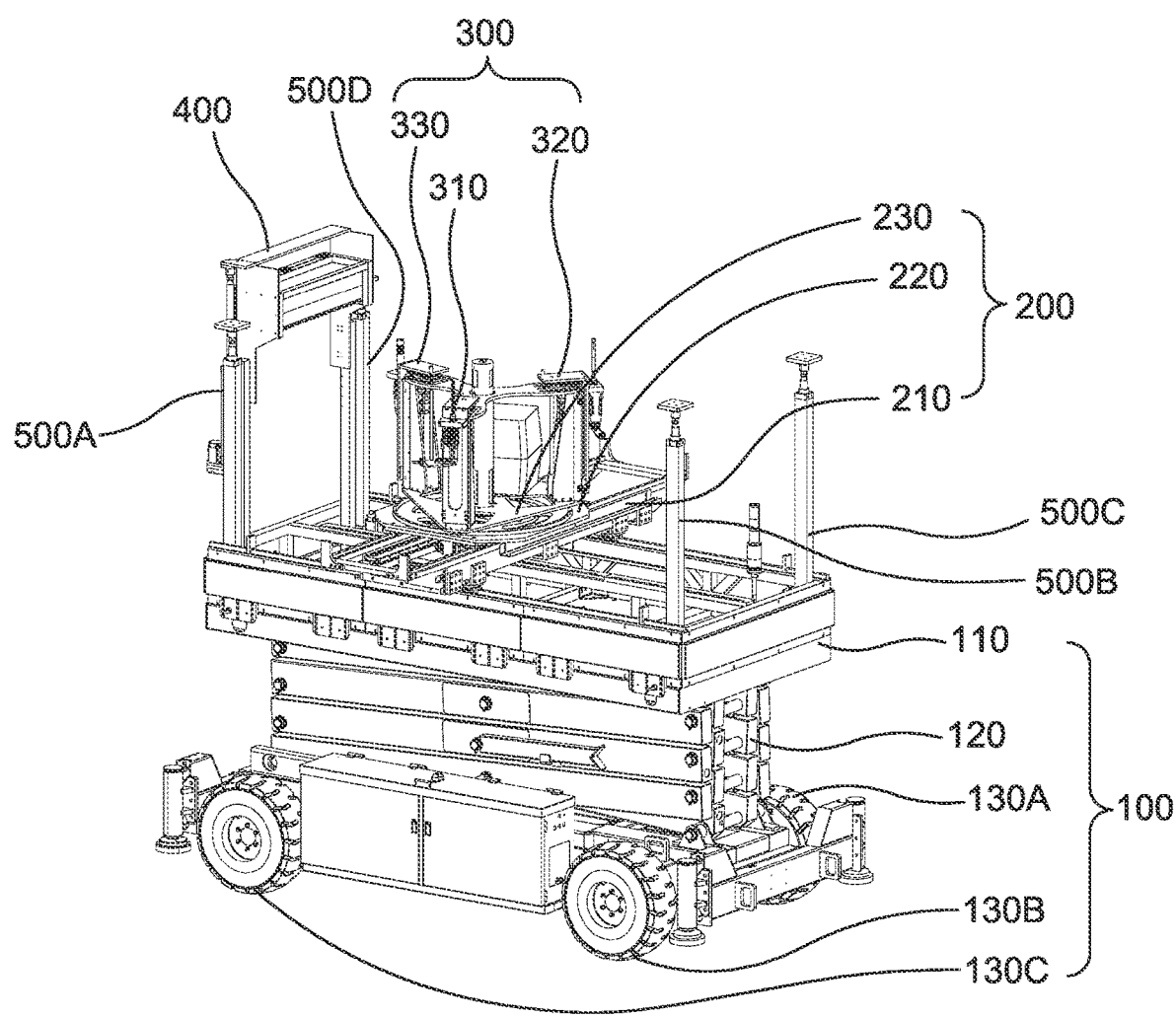
FIG. 1 is a drawing schematically illustrating a construction robot for a ceiling in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure.

In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained in detail by referring to attached diagrams as shown below.

FIG. 1 is a drawing schematically illustrating a construction robot for a ceiling in accordance with one example embodiment of the present disclosure.

By referring to FIG. 1, the construction robot may include a robot base 100, a targeting unit 200, a robotic arm assembly 300, and a loading unit 400.

First, the robot base 100 may correspond to a lower part of the construction robot and may include an upper plate 110 which may be controlled to be elevated or lowered for anchor installation.

And, the robot base 100 may further include a scissor lift 120 for elevating or lowering the upper plate 110, and the scissor lift 120 may be installed under the upper plate 110. But the scope of the present disclosure is not limited thereto. For example, the scissor lift 120 may be replaced with any device, e.g., a rack-and-pinion elevating device, a motor-driven elevating device, a hydraulic elevating device, etc., capable of elevating or lowering the upper plate 110.

Also, the robot base 100 may further have multiple wheels 130A, 130B, and 130C thereunder for moving, but the scope of the present disclosure is not limited thereto, and the robot base 100 may move about at a workplace by using various ways of moving.

In addition, the robot base 100 may further include a location fixing device to be used for fixing the construction robot at a certain location on the workplace.

Next, the targeting unit 200 may include: a first targeting sub-unit 210, a second targeting sub-unit 220, and a rotating sub-unit 230. The first targeting sub-unit 210 mounted on the upper plate 110 may be controlled to move along first directions corresponding to at least one first rack, serving as a first track, on the upper plate 110 according to information on the ceiling. Herein, the first directions may be directions of the positive or negative x-axis on a plane of the upper plate 110 as the case may be. The second targeting sub-unit 220 mounted on the first targeting sub-unit 210 may be controlled to move along second directions corresponding to at least one second rack, serving as a second track, on the first targeting sub-unit 210 according to the information on the ceiling. Herein, the second directions may be directions of the positive or negative y-axis on the plane of the upper plate 110 as the case may be. The rotating sub-unit 230 mounted on the second targeting sub-unit 220 may be controlled to be positioned under a specific spot in the ceiling by being moved along the first directions and/or the second directions on the upper plate 110 and may be controlled to rotate about its own axis according to the information on the ceiling.

Figure 2:
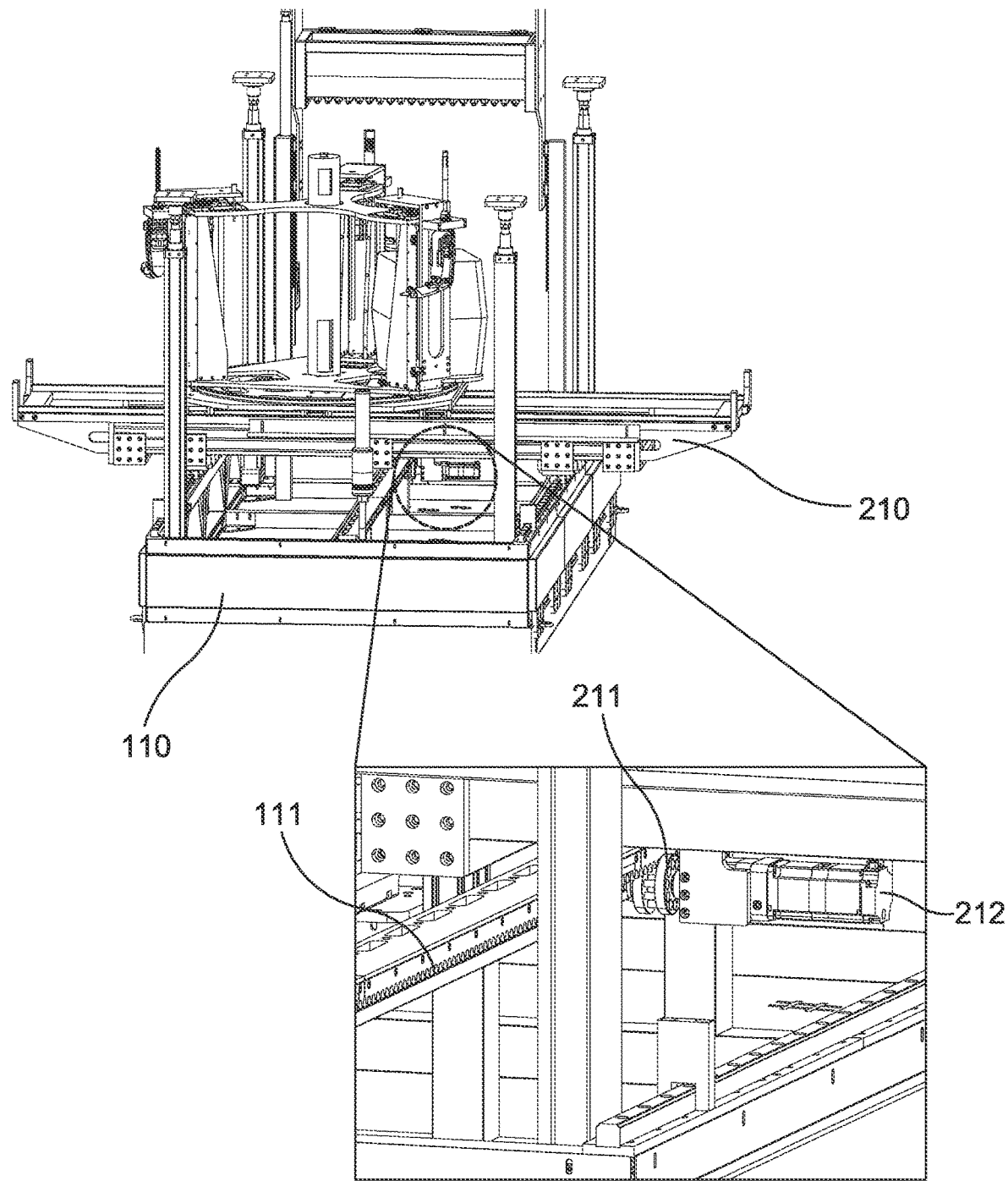
FIG. 2 is a drawing schematically illustrating an upper plate mounted on a robot base of the construction robot, a first targeting sub-unit mounted on the upper plate, and details of their connection in accordance with one example embodiment of the present disclosure.

In detail, by referring to FIG. 2, a first pinion 211 may be formed under the first targeting sub-unit 210 and may be engaged with the first rack 111 on the upper plate 110. Herein, the first pinion 211 may be driven by a first servomotor 212 for horizontal movement. Therefore, the first targeting sub-unit 210 may be controlled to move along the first directions according to rotation of the first pinion 211.

Figure 3:
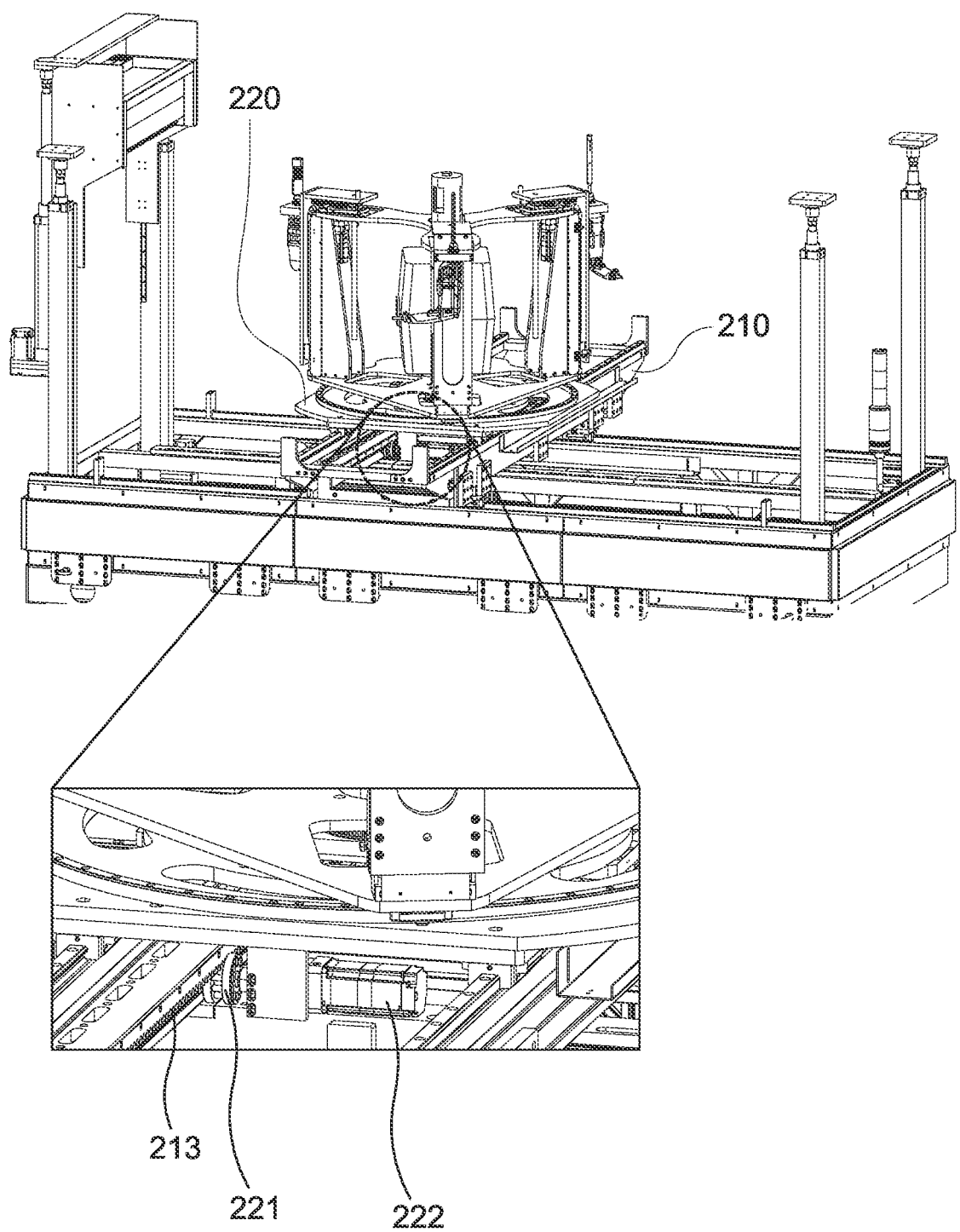
FIG. 3 is a drawing schematically illustrating the first targeting sub-unit, a second targeting sub-unit mounted on the first targeting sub-unit, and details of their connection in accordance with one example embodiment of the present disclosure.

Also, by referring to FIG. 3, a second pinion 221 may be formed under the second targeting sub-unit 220 and may be engaged with the second rack 213 on the first targeting sub-unit 210. Herein, the second pinion 221 may be driven by a second servomotor 222 for the horizontal movement. Therefore, the second targeting sub-unit 220 may be controlled to move along the second directions according to rotation of the second pinion 221.

Figure 4:
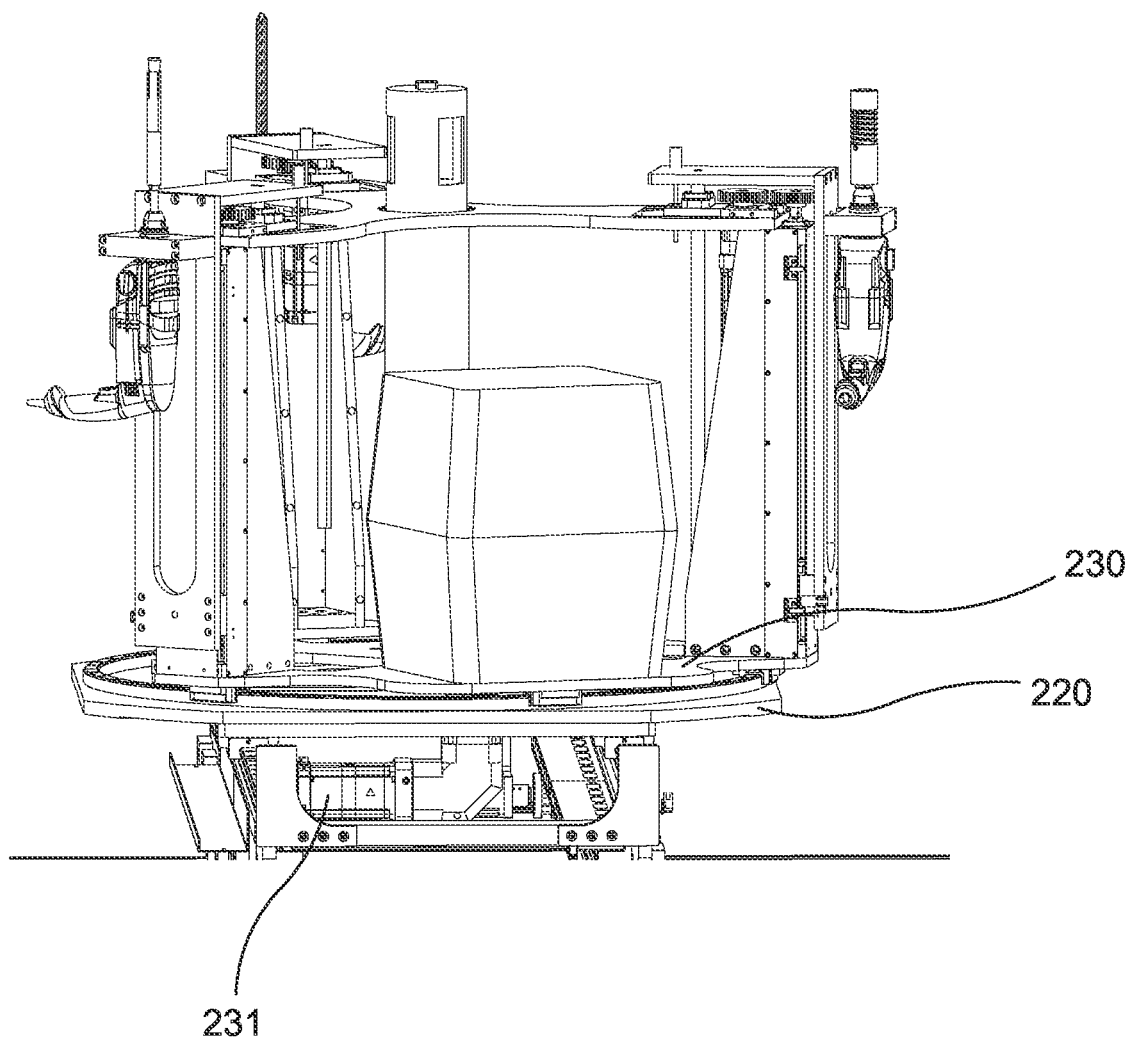
FIG. 4 is a drawing schematically illustrating a rotating sub-unit in accordance with one example embodiment of the present disclosure.

Also, by referring to FIG. 4, the rotating sub-unit 230 may be mounted on the second targeting sub-unit 220 and may be controlled to rotate about its own axis by a third servomotor 231 for the horizontal movement installed under the rotating sub-unit 230.

Meanwhile, the first targeting sub-unit 210, the second targeting sub-unit 220, and the rotating sub-unit 230 are described above as being moved or rotated by using a rail track system with a rack-and-pinion mechanism, however, as another example, a driving and steering system, commonly used in AGVs (Automated Guided Vehicles), autonomous mobile robots, etc. for example, may be used for allowing the movement or the rotation in the workplace.

Next, the robotic arm assembly 300 may include a first robotic arm 310, a second robotic arm 320, and a third robotic arm 330. Herein, each of at least part of a first elevating unit of the first robotic arm 310, at least part of a second elevating unit of the second robotic arm 320, and at least part of a third elevating unit of the third robotic arm 330 may be controlled to be elevated or lowered and may be combined with the rotating sub-unit 230.

Figure 5A:
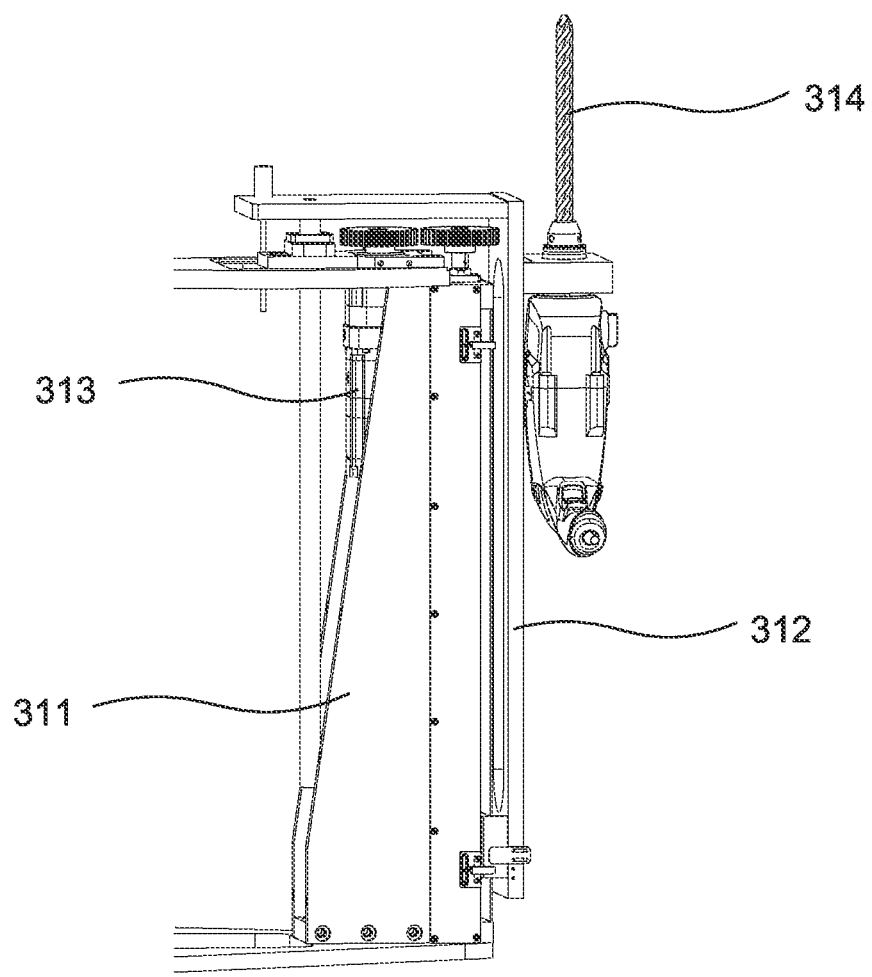
FIGS. 5A to 5C are drawings schematically illustrating a first robotic arm, a second robotic arm, and a third robotic arm, in accordance with one example embodiment of the present disclosure.

In detail, by referring to FIG. 5A, the first robotic arm 310 may include (1) a first arm supporting unit 311, combined with the rotating sub-unit 230, among arm supporting units, (2) the first elevating unit 312, combined with the first arm supporting unit 311 and controlled to move toward or away from the ceiling, among elevating units, and (3) a first servomotor 313 for vertical movement. Herein, the first elevating unit 312 may be engaged with the first arm supporting unit 311. And the first elevating unit 312 may be controlled to elevate or lower a drill 314 mounted thereon. Further, the first servomotor 313 for the vertical movement may be combined with the first arm supporting unit 311, and the at least part of the first elevating unit 312 together with the drill 314 may be controlled to be elevated or lowered by the first servomotor 313 for the vertical movement. Herein, the drill 314 may include a driving unit (not shown) for driving the drill 314. Also, the first robotic arm 310 may further include a dust capturing device (not shown) for capturing dust while the drill 314 drills the hole into the ceiling.

Figure 5B:
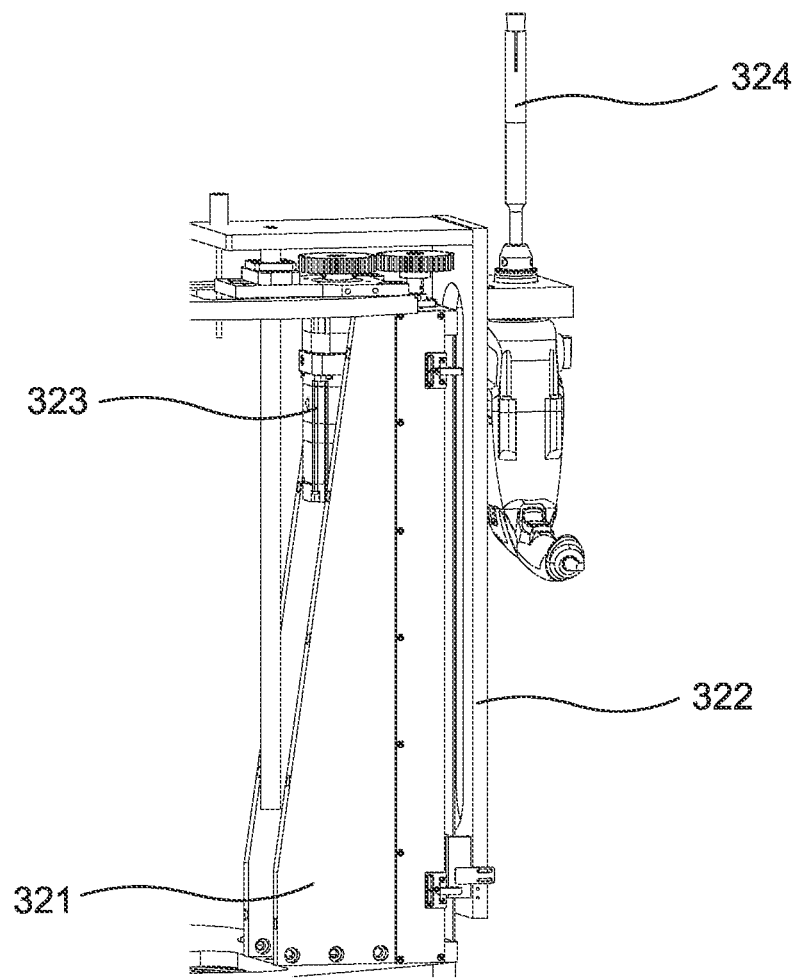

Also, by referring to FIG. 5B, the second robotic arm 320 may include (1) a second arm supporting unit 321, combined with the rotating sub-unit 230, among the arm supporting units, (2) the second elevating unit 322, combined with the second arm supporting unit 321 and controlled to move toward or away from the ceiling, among the elevating units, and (3) a second servomotor 323 for the vertical movement. Herein, the second elevating unit 322 may be engaged with the second arm supporting unit 321. And the second elevating unit 322 may be controlled to elevate or lower an anchor bolt inserting equipment 324 mounted thereon for inserting the anchor bolt into the hole. Further, the second servomotor 323 for the vertical movement may be combined with the second arm supporting unit 321, and the at least part of the second elevating unit 322 together with the anchor bolt inserting equipment 324 may be controlled to be elevated or lowered by the second servomotor 323 for the vertical movement. Herein, the anchor bolt inserting equipment 324 may include a driving unit (not shown) for driving the anchor bolt inserting equipment 324. Also, the second robotic arm 320 may further include a dust capturing device (not shown) for capturing dust while the anchor bolt inserting equipment 324 inserts the anchor bolt into the hole in the ceiling.

Figure 5C:
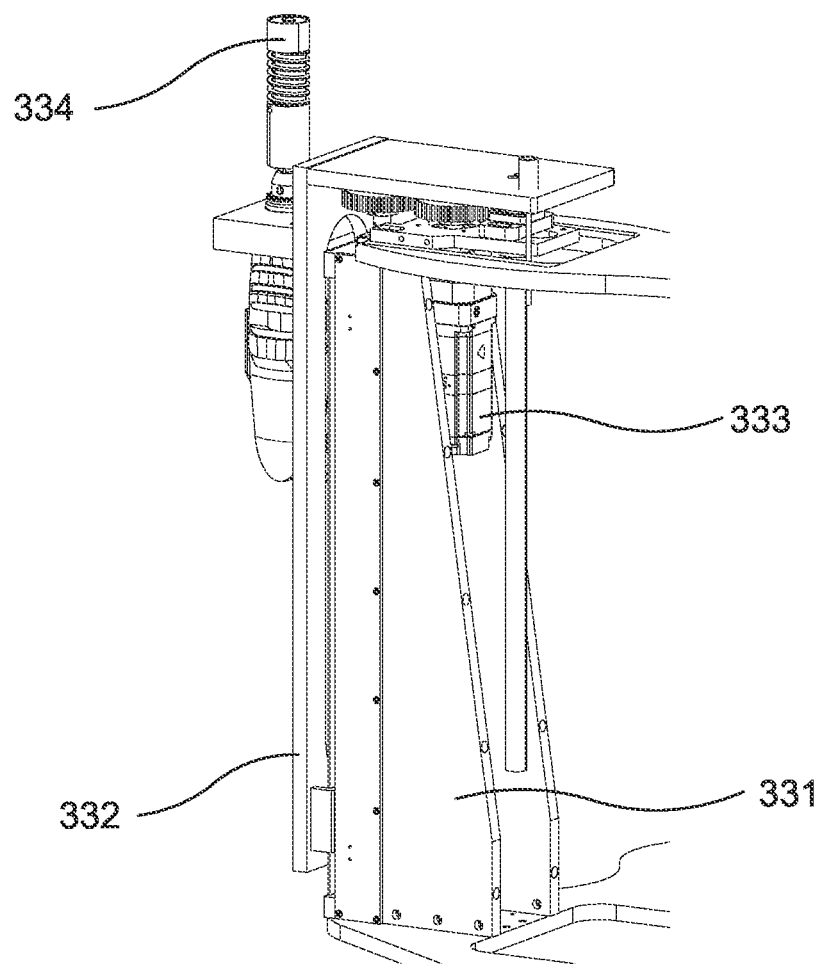

Also, by referring to FIG. 5C, the third robotic arm 330 may include (1) a third arm supporting unit 331, combined with the rotating sub-unit 230, among the arm supporting units, (2) the third elevating unit 332, combined with the third arm supporting unit 331 and controlled to move toward or away from the ceiling, among the elevating units, and (3) a third servomotor 333 for the vertical movement. Herein, the third elevating unit 332 may be engaged with the third arm supporting unit 331. And the third elevating unit 332 may be controlled to elevate or lower an impact wrench 334 mounted thereon for engaging the anchor nut with the anchor bolt and tightening the anchor nut. Further, the third servomotor 333 for the vertical movement may be combined with the third arm supporting unit 331, and the at least part of the third elevating unit 332 together with the impact wrench 334 may be controlled to be elevated or lowered by the third servomotor 333 for the vertical movement. Herein, the impact wrench 334 may include a driving unit (not shown) for driving the impact wrench 334. Also, the third robotic arm 330 may further include a dust capturing device (not shown) for capturing dust while the impact wrench 334 engages the anchor nut with the anchor bolt.

Meanwhile, each of the first robotic arm 310, the second robotic arm 320, and the third robot arm 330, respectively combined with the rotating sub-unit 230, may be controlled to move along a same trajectory when the rotating sub-unit 230 is controlled to rotate about its own axis.

That is, due to rotation of the rotating sub-unit 230 about its own axis, each of the first robotic arm 310, the second robotic arm 320, and the third robotic arm 330 may be controlled to be positioned under a same location on the ceiling, to thereby drill the hole, insert the anchor bolt into the hole, and tighten the anchor nut engaged with the anchor bolt, all under the same location on the ceiling.

Also, due only to the rotation of the rotating sub-unit 230, a process of inserting the anchor into the ceiling may be performed by using the first robotic arm 310, the second robotic arm 320, and the third robotic arm 330 interchangeably, even in a tight space.

Meanwhile, each of the first robotic arm 310, the second robotic arm 320, and the third robotic arm 330 is described above as comprised of its corresponding arm supporting unit, its corresponding elevating unit, and its corresponding servomotor for the vertical movement. However, as another example, each of the first robotic arm 310, the second robotic arm 320, and the third robotic arm 330 may be an articulated robotic arm.

Next, the loading unit 400 may be mounted on at least one of the upper plate 110, the first targeting sub-unit 210, and the second targeting sub-unit 220. And the loading unit 400 may be controlled to provide one or more anchor bolt assemblies 430, each of which is created by engaging the anchor bolt with the anchor nut.

Figure 6:
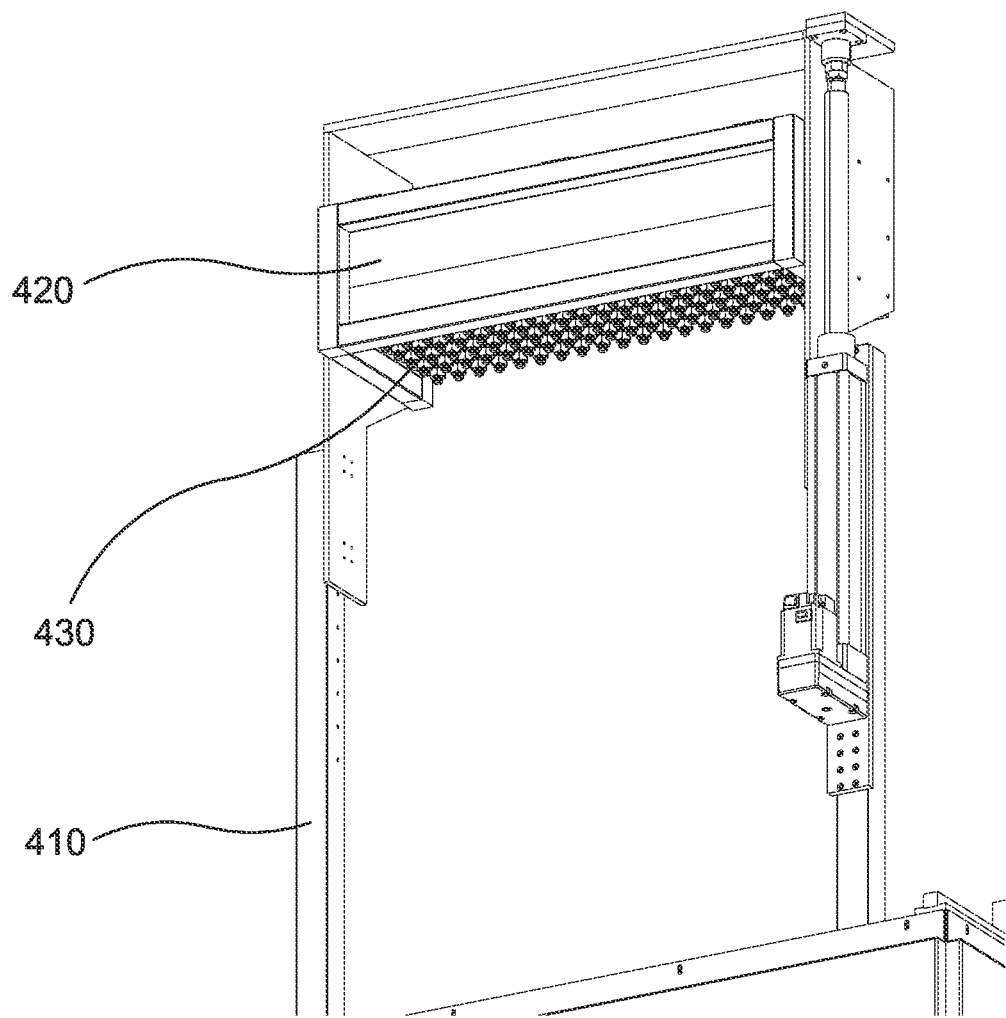
FIG. 6 is a drawing schematically illustrating a loading unit in accordance with one example embodiment of the present disclosure.

Specifically, by referring to FIG. 6, the loading unit 400 may include (1) at least one load supporting unit 410 mounted on at least one of the upper plate 110, the first targeting sub-unit 210, and the second targeting sub-unit 220 and (2) an anchor assembly supplying unit 420, on which the anchor bolt assemblies 430 are to be loaded, combined with the load supporting unit 410 and controlled to move toward or away from the robotic arm assembly 300.

Meanwhile, a plurality of leveling units 500A, 500B, 500C, and 500D may be mounted on the upper plate 110 movably toward or away from the ceiling. The leveling units 500A, 500B, 500C, and 500D may allow the upper plate 110 to be leveled by making contact with the ceiling. Herein, each of the leveling units 500A, 500B, 500C, and 500D may be controlled to be elevated or lowered by each of electric actuators, but the scope of the present disclosure is not limited thereto, and may be controlled to be elevated or lowered by using various actuators, such as hydraulic actuators, pneumatic actuators, etc.

Further, each of the leveling units 500A, 500B, 500C, and 500D may be controlled to be elevated or lowered simultaneously by a same distance, or as another example, may be controlled to be elevated or lowered respectively by different distances.

Also, each of the leveling units 500A, 500B, 500C, and 500D may be controlled to be fixed such that the upper plate 110 is leveled against the ceiling, or as another example, each of the leveling units 500A, 500B, 500C, and 500D may be controlled to be fixed such that the upper plate 110 is leveled against a horizontal plane.

Processes of the anchor installation at the workplace by using the construction robot for the ceiling configured as above in accordance with one example embodiment of the present disclosure are described as follows.

First, the construction robot may be controlled to transport itself to a predetermined location under the specific spot in the ceiling at the workplace by operating the robot base 100. Herein, after moving to the predetermined location, the robot base 100 may prevent the construction robot from being moved out of the predetermined location, by using the location fixing device.

Also, the construction robot may be controlled to elevate the leveling units 500A, 500B, 500C, and 500D combined with the upper plate 110, to thereby allow the leveling units 500A, 500B, 500C, and 500D to make contact with the ceiling, thus allowing the upper plate 110 to be leveled. Herein, although the process of leveling the upper plate 110 is described as being performed before processes of adjusting the first targeting sub-unit 210, the second targeting sub-unit 220, and the rotating sub-unit 230 described below, the scope of the present disclosure is not limited thereto, and the process of leveling the upper plate 110 may be performed at any step after the process of fixing the construction robot at the predetermined location under the specific spot and before the process of drilling the hole on the specific spot.

And, the first targeting sub-unit 210 may be controlled to move on the upper plate 110 toward the loading unit 400 along the first directions, then the second targeting sub-unit 220 may be controlled to move along the second directions so that the third robotic arm 330 is allowed to be positioned near the loading unit 400 if the rotating sub-unit 230 is rotated, and the rotating sub-unit 230 may be controlled to rotate about its own axis so that the third robotic arm 330 is positioned near the loading unit 400. Herein, if the third robotic arm 330 is positioned near the loading unit 400, the impact wrench 334 may be controlled to loosen and disengage the anchor nut from one of the anchor bolt assemblies loaded on the loading unit 400 and may be controlled to hold the disengaged anchor nut.

Herein, the at least part of the third elevating unit of the third robotic arm 330 may be controlled to move toward the loading unit 400, then the impact wrench 334 may be controlled to disengage and hold the anchor nut, and the at least part of the third elevating unit may be controlled to move away from the loading unit 400.

As another example, the loading unit 400 may be controlled to move toward the impact wrench 334, then the impact wrench 334 may be controlled to disengage and hold the anchor nut, and the loading unit 400 may be controlled to move away from the impact wrench 334.

Next, while the disengaged anchor nut is held by the impact wrench 334, the rotating sub-unit 230 may be controlled to rotate about its own axis so that the second robotic arm 320 is positioned near the loading unit 400. Then, the anchor bolt inserting equipment 324 may be provided with the anchor bolt from which the anchor nut is disengaged.

Herein, the at least part of the second elevating unit of the second robotic arm 320 may be controlled to move toward the loading unit 400, and the anchor bolt inserting equipment 324 may be provided with the anchor bolt, from which the anchor nut is disengaged, loaded on the loading unit 400, then the at least part of the second elevating unit may be controlled to move away from the loading unit 400.

As another example, the loading unit 400 may be controlled to move toward the anchor bolt inserting equipment 324, and the anchor bolt inserting equipment 324 may be provided with the anchor bolt, from which the anchor nut is disengaged, loaded on the loading unit 400, then the loading unit 400 may be controlled to move away from the anchor bolt inserting equipment 324.

Next, the targeting unit 200 may be controlled to move to the specific spot in the ceiling, so that the first robotic arm 310 may be positioned under the specific spot in the ceiling for the anchor installation. Herein, if the first robotic arm 310 is positioned under the specific spot, the at least part of the first elevating unit of the first robotic arm 310 may be controlled to be elevated, to thereby allow the drill 314 to drill the hole on the specific spot, and then may be controlled to be lowered.

Next, if the hole is drilled on the specific spot, the rotating sub-unit 230 may be controlled to rotate about its own axis so that the second robotic arm 320 is positioned under the specific spot. Herein, if the second robotic arm 320 is positioned under the specific spot, the at least part of the second elevating unit of the second robotic arm 320 may be controlled to be elevated, to thereby allow the anchor bolt inserting equipment 324 to insert the anchor bolt into the hole on the specific spot, and then may be controlled to be lowered. Herein, after inserting the anchor bolt into the hole, the anchor bolt inserting equipment 324 may be controlled to fix the anchor bolt in the hole by punching operation.

Next, if the anchor bolt is inserted into the hole, the rotating sub-unit 230 may be controlled to rotate about its own axis so that the third robotic arm 330 is positioned under the specific spot. Herein, if the third robotic arm 330 is positioned under the specific spot, the at least part of the third elevating unit of the third robotic arm 330 may be controlled to be elevated, to thereby allow the impact wrench 334 to engage the anchor nut with the anchor bolt inserted into the hole on the specific spot, and then may be controlled to be lowered.

The present disclosure has an effect of reducing time consumed for inserting the anchors into the ceiling by using a method and a structure for controlling the drill for drilling the hole, the anchor bolt inserting equipment for inserting the anchor bolt into the hole, and the impact wrench for tightening the anchor nut engaged with the inserted anchor bolt.

The present disclosure has another effect of allowing the anchor installation even in the tight space by using the drill, the anchor bolt inserting equipment, and the impact wrench interchangeably due to the rotation of the rotating sub-unit on which the drill, the anchor bolt inserting equipment, and the impact wrench are mounted.

The present disclosure has still another effect of allowing each of the drill, the anchor bolt inserting equipment, and the impact wrench to be positioned at a same spot on the ceiling by the rotation of the rotating sub-unit alone.

The present disclosure has still yet another effect of allowing the anchor bolt and the anchor nut to be automatically provided by using the loading unit.

The present disclosure has still yet another effect of allowing the upper plate to be leveled by using the plurality of the leveling units.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the spirit of the present disclosure must not be confined to the explained embodiments, and the following patent claims as well as everything including variations equal or equivalent to the patent claims pertain to the category of the spirit of the present disclosure.

What is claimed is:

1. A construction robot for a ceiling, comprising:
   a robot base including an upper plate, wherein the upper plate is controlled to be elevated or lowered for anchor installation;
   a targeting unit mounted on the upper plate, wherein the targeting unit is controlled to move a robotic arm assembly for the anchor installation, and
   wherein the robotic arm assembly includes:
      a first robotic arm, combined with the targeting unit, on which a drill for drilling a hole into the ceiling is mounted, wherein at least part of a first elevating unit of the first robotic arm is controlled to be elevated or lowered according to information on the ceiling,
      a second robotic arm, combined with the targeting unit, on which an anchor bolt inserting equipment for inserting at least one anchor bolt into the hole is mounted, wherein at least part of a second elevating unit of the second robotic arm is controlled to be elevated or lowered according to the information on the ceiling, and
      a third robotic arm, combined with the targeting unit, on which an impact wrench for tightening the anchor bolt by engaging at least one anchor nut with the anchor bolt is mounted, wherein at least part of a third elevating unit of the third robotic arm is controlled to be elevated or lowered according to the information on the ceiling; and
   a loading unit, mounted on at least one of the upper plate and the targeting unit, for providing one or more anchor bolt assemblies, each of which is created by engaging the anchor bolt with the anchor nut.

2. The construction robot of claim 1, wherein each of the first robotic arm, the second robotic arm, and the third robotic arm, respectively combined with a rotating sub-unit in the targeting unit, is controlled to move along a same trajectory when the rotating sub-unit is controlled to rotate about its own axis.

3. The construction robot of claim 1, wherein each of the first robotic arm, the second robotic arm, and the third robotic arm includes (1) its corresponding each of arm supporting units combined with a rotating sub-unit in the targeting unit and (2) its corresponding each of elevating units engaged with each of the arm supporting units and wherein at least part of each of the elevating units, driven by each of servomotors for vertical movement combined with each of the arm supporting units, is controlled to be elevated or lowered.

4. The construction robot of claim 1, wherein the targeting unit includes: a first targeting sub-unit mounted on the upper plate wherein the first targeting sub-unit is controlled to move along first directions corresponding to at least one first rack, serving as a first track, on the upper plate according to the information on the ceiling; a second targeting sub-unit mounted on the first targeting sub-unit wherein the second targeting sub-unit is controlled to move along second directions corresponding to at least one second rack, serving as a second track, on the first targeting sub-unit according to the information on the ceiling; and a rotating sub-unit mounted on the second targeting sub-unit wherein the rotating sub-unit is controlled to rotate about its own axis according to the information on the ceiling.

5. The construction robot of claim 4, wherein, while a first pinion formed under the first targeting sub-unit is engaged with the first rack, the first targeting sub-unit is controlled to move along the first directions according to rotation of the first pinion driven by a first servomotor for horizontal movement, wherein, while a second pinion formed under the second targeting sub-unit is engaged with the second rack, the second targeting sub-unit is controlled to move along the second directions according to rotation of the second pinion driven by a second servomotor for the horizontal movement, and wherein the rotating sub-unit is controlled to rotate about its own axis by a third servomotor for the horizontal movement.

6. The construction robot of claim 1, wherein the loading unit includes (1) at least one load supporting unit mounted on at least one of the upper plate and the targeting unit and (2) an anchor assembly supplying unit, on which the anchor bolt assemblies are to be loaded, combined with the load supporting unit movably toward or away from the robotic arm assembly.

7. The construction robot of claim 1, further comprising a plurality of leveling units mounted on the upper plate movably toward or away from the ceiling and wherein the leveling units allow the upper plate to be leveled by making contact with the ceiling.

8. The construction robot of claim 1, wherein the upper plate is mounted on the robot base and wherein the robot base includes a scissor lift which is controlled to elevate or lower the upper plate.

9. The construction robot of claim 1, wherein (i) the targeting unit is controlled to move toward the loading unit and then the rotating sub-unit is controlled to rotate about its own axis so that the third robotic arm is positioned near the loading unit, to thereby allow the impact wrench to loosen and disengage the anchor nut from one of the anchor bolt assemblies loaded on the loading unit and thus to hold the disengaged anchor nut, (ii) the rotating sub-unit is controlled to rotate about its own axis while the disengaged anchor nut is held by the impact wrench so that the second robotic arm is positioned near the loading unit, to thereby allow the anchor bolt inserting equipment to be provided with the anchor bolt, (iii) while the at least part of the first elevating unit of the first robotic arm is controlled to be elevated or lowered, the targeting unit is controlled to move to a specific spot in the ceiling and then the rotating sub-unit is controlled to rotate about its own axis so that the first robotic arm is positioned under the specific spot in the ceiling, to thereby allow the drill to drill the hole on the specific spot, (iv) while the at least part of the second elevating unit of the second robotic arm is controlled to be elevated or lowered, the rotating sub-unit is controlled to rotate about its own axis so that the second robotic arm is positioned under the specific spot, to thereby allow the anchor bolt inserting equipment to insert the anchor bolt into the hole, and (v) while the at least part of the third elevating unit of the third robotic arm is controlled to be elevated or lowered, the rotating sub-unit is controlled to rotate about its own axis so that the third robotic arm is positioned under the specific spot, to thereby allow the impact wrench to engage the anchor nut with the anchor bolt inserted into the hole and to tighten the anchor nut.

\* \* \* \* \*